Nov. 12, 1963  A. KRAMISH  3,110,811

SELF-PROPELLED NUCLEAR RADIOMETER

Filed May 23, 1960

INVENTOR
ARNOLD KRAMISH

BY Leech and Radue

ATTORNEYS 3,110,811
SELF-PROPELLED NUCLEAR RADIOMETER
Arnold Kramish, Washington, D.C.
(1135 Corsica Drive, Pacific Palisades, Calif.)
Filed May 23, 1960, Ser. No. 32,507
15 Claims. (Cl. 250—106)

This invention pertains to a self-propelled nuclear device, which may be used as a demonstration apparatus for educational purposes, as a power source, and as a laboratory measuring instrument. In comparison with the familiar solar radiometer, the instrument of this invention operates to produce measurable and observable mechanical movement from nuclear reactions instead of depending upon solar radiation.

Unlike the "Nuclear Radiometer for Neutron Flux Measurement" of my prior patent application Serial No. 550,098, filed November 30, 1955, the present device does not depend upon an external source of neutron flux for its operation, but embodies a self-contained radiation source.

The present operation will be more readily understandable if consideration is first given to the principles of operation of the solar radiometer.

In the solar radiometer a spaced set of vanes is mounted coplanar with the axis of a fine vertical shaft rotatably mounted in a partially evacuated glass chamber. Ordinarily one side of each vane is blackened and, when the apparatus is exposed to thermal radiation from the sun or an artificial source, the vanes and their shaft will rotate. The drivng or propelling force is obtained by reason of the blackening which provides greater absorption and preferential heating by the sun or equivalent radiant energy of the thermal type. Thus the molecules of gas in the glass chamber upon striking the vanes rebound with greater force from the more heated blackened sides than the less heated sides. In this manner directional kicks are given to each of the vanes in the same direction and the shaft mounted assembly is caused to rotate.

The nuclear device of this invention utilizes a nuclear radiation source to produce preferential heating of a unique vane structure. The nuclear radiation required for its operation is continuously produced by radioactive materials forming an integral part of the vane structure.

The problem of providing an adequate vane structure for such nuclear devices involves several factors that must be dealt with adequately if an instrument of the required accuracy and dependability is to be provided. First, the principal structural element of the vane must have limited heat conductivity. In many solar radiometers this structural element is mica, which has about $\frac{1}{1000}$ the heat conductivity of most metals. This same substance has been found to be satisfactory for the main structural element of the present self-propelled nuclear radiometer, although it should be recognized that there are numerous other materials that would be appropriate.

In the preferred vane structure a coating of radioactive material is applied to one face of the mica element to which a sputtered coating of gold has previously been applied, and finally the layer or coating of radioactive material is covered with a gold sputter coating. With such a vane structure or sandwich a substantial portion of the nuclear particles are prevented from escaping from the vane, and are used with maximum efficiency to cause preferential heating of the adjacent side of the vane.

Those particles which do escape will be absorbed in the walls of the casing or container in which the moving structure of the radiometer is encased, and in thus escaping contribute to the rotational effect on the vanes by reason of reaction kicks or impulses. In the event that the radiometer case is made of an optical material such as glass, it is desirable to apply the same type of non-radioactive coating, namely, sputtered gold, to the side of each vane in which preferential heating does not occur. This additional, non-radioactive coating would function to insure that both sides of the vane have the same optical albedo, and the operation of the radiometer will be independent of any non-nuclear radiation incident upon it.

The practicability of the instrument of this invention can be demonstrated by a comparative study of radioisotope and solar power. While the radiometer effect can be produced with heat fluxes less than the solar constant equivalent, the following calculations are made on the solar constant basis in order to compare the nuclear radiometer of this invention with a known workable standard: An isotope with a simple emission structure emits per curie per second $$3.7 \times 10^{10}.E \text{ m.e.v.}$$

where $E$ is the mean energy of the radiation in m.e.v. This is equivalent to $$(3.7 \times 10^{10} E)(1.6 \times 10^{-6})$$
$$= 5.92 \times 10^{4} E \text{ ergs/sec.} = 5.92 \times 10^{-3} E$$

watts per curie.

Suppose that radioisotope power can be utilized with an overall efficiency $\epsilon_1$, and solar power at the earth's surface can be utilized with an efficiency $\epsilon_2$.

Now 1 watt=14 cal./min.

Hence:

$$\text{radioisotope power} = 5.92 \times 10^{-3} E \epsilon_1 (14)$$
$$= 8.4 \times 10^{-2} E \epsilon_1 \text{ cal./curie/min.}$$

The solar constant is 2 cal./cm.$^2$/min. If this is utilized over an area $A$ with an efficiency $\epsilon_2$ and is equated to a radioisotope source of $C$ curies, then $$8.4 \times 10^{-4} E C \epsilon_1 = 2 A \epsilon_2$$

or $$E C \epsilon_1 = 24 A \epsilon_2$$

Thus if the average energy of a source is 1 m.e.v. and two equally efficient isotope and solar sources are compared, it will take 24 curies/cm.$^2$ for equal power.

The solar constant defines that energy which is incident upon the outer atmosphere of the earth. Actually, the average solar insolation at the earth's surface is less than one-tenth of the solar constant, so that if the operability of the radiometer of this invention is to be compared with that of the crudely constructed optical radiometer such as is often found in jewelers' windows, it would require, under average conditions, vane coatings of approximately 1 curie per square centimeter per m.e.v. But since laboratory optical radiometers are constructed with much greater sensitivity, the same type of construction applied to the nuclear radiometer of this invention would require a vane coating that could be 0.1 curie/cm.$^2$/m.e.v. or less, according to the particular use.

Having thus set forth the principles and main objectives, it is believed that a more complete understanding of this invention will be obtained from the following detailed description of a preferred embodiment thereof, when taken in connection with the accompanying drawing, in which.

Figure 2:
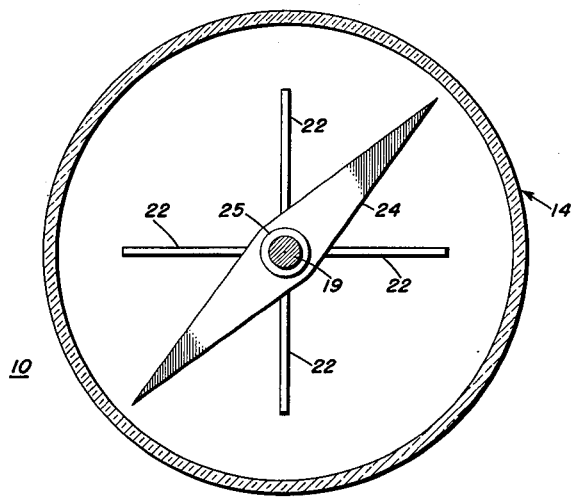
FIGURE 2 is a horizontal section view taken on line 2—2 of FIGURE 1.
Figure 1:
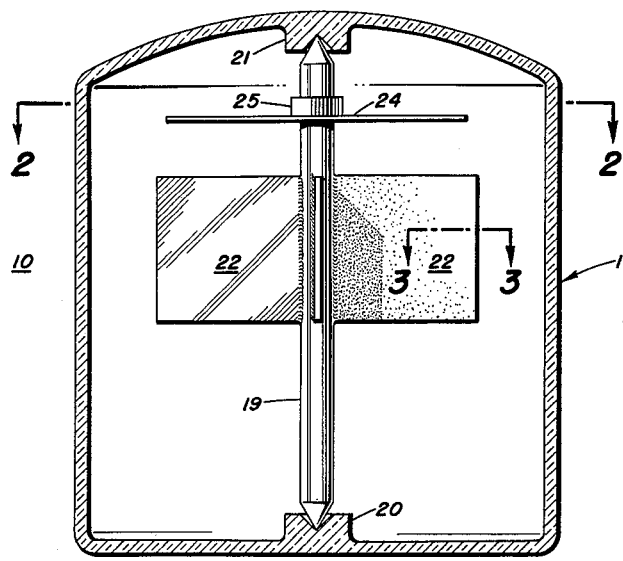
FIGURE 1 is a vertical section of the nuclear radiometer.

In the radiometer, which is designated generally by numeral 10, a unitary and integral casing 14, which for some uses is preferably of transparent optical glass for purposes of observation, encloses a vertically mounted, needle-like shaft 19 supported at the lower end by a step bearing 20 and at the upper end by a similar step bearing 21. Intermediate the length of the shaft 19 are four equally spaced vanes 22 integrally secured by their respective inner edges to the shaft and disposed to lie in the same plane as the axis of shaft rotation. A double ended pointer 24, the ends of which extend beyond the extremities of the vanes, is mounted on the upper end portion of the shaft 19 by means of a collar 25 in order that the rate of shaft rotation may be more readily observed.

The bearings 20 and 21 may be of jewel bearing material, e.g., zircon, or glass, or suitable metal, the preference being for friction-free gyroscopic type bearings. The shaft 19 as well as its pointer 24 may be of ceramics, glass, zirconium or steel, or other suitable metals. Because of its economy and little likelihood of breakage, commercial plastic material of suitable characteristics may also be employed.

An approximate idea as to the size of the radiometer 10 may be obtained from the fact that in the illustrated embodiment the vanes 22 are 1.0 cm.×1.0 cm.

Figure 3:
FIGURE 3 is an enlarged cross-section of one of the vanes as taken along line 3—3 of FIGURE 1.

The structure and composition of the preferred type of vane is clearly indicated in the enlarged FIGURE 3 in which a main or base lamination of mica 26 has its lower surface covered with a gold sputter coating 28, the lower surface of which is in turn provided with a coating of alpha or beta emitting material 30, and the sandwich construction thus formed is completed by another gold sputter coating 32 lying beneath the emitter coating 30.

The vane structure as illustrated in FIGURE 3 and embodying alpha emitters represents the best mode now known for practicing this invention.

From the foregoing explanation of this invention and the description of a preferred embodiment thereof it will be understood that the operation of the nuclear device 10 is one of rotation of the shaft 19 carrying the vanes 22, and is produced by preferential heating on the same face of each vane 22 by absorption of the energy of the radioactive alpha or beta particles. Thus this instrument provides an educational tool that may be used for simple instruction in the subject of radioactivity. It is also useful for demonstrating the relative energies of heated and lesser heated gases in a closed system, for which purpose helium or any other demonstration gas or gas mixture may be used.

The following represent other of the many and varied applications of this invention:

The self-propelled nuclear radiometer can be used to demonstrate the utility of the nuclear radiometer for neutron flux measurement, which is disclosed in said patent application Serial No. 550,098, now U.S. Patent No. 2,951,942 issued September 6, 1960.

The device may also be used as a desk display of a scientific novelty.

This nuclear device also affords means for the direct translation of atomic energy into mechanical energy. Although the foreseeable amount of work which could be obtained from such a device is relatively small, it is sufficient for special applications such as the powering of timing devices, the coupling being by any obvious means such, for instance, as magnetic if the driven apparatus is to be outside of the housing. Otherwise it may be inside, directly coupled and the result taken out, for instance, by electric conductors in a well known manner.

By utilizing a dynamo-like coupling to the mechanical motion of the device of this invention, small amounts of electrical power can be obtained.

It is to be especially observed that the rotation of the self-powered nuclear radiometer is very sensitive to the pressure of the gaseous medium within which it operates. Thus, if coupled to a vacuum system, it may be used to detect changes of pressure within that system. The detection may be accomplished by mechanical or electrical means, but it should also be noted that a unique opportunity is offered here for the visual observation of pressure changes within a vacuum system, for if the radiometer motion were observed by means of a stroboscopic light, changes in speed of rotation could be observed.

The useful range of measurement of the device as a pure radiometer, even without the propulsive effect of the reaction impulses of escaping particles, is effective to pressures below $10^{-8}$ mm. Hg.

It is emphasized that particular use requirements may dictate greater amounts of radioactive coating than the bare minima required to produce radiometer motion.

There are many radioactive isotopes which are appropriate for use in this self-powered nuclear radiometer. The choice of these would depend upon many design factors which may vary widely in different applications of this radiometer. These factors include: The relative costs of the different isotopes; the desired power and sensitivity of the device; the degree of precision of manufacture of the device; and, whether or not it is desired to minimize the presence of electromagnetic radiation outside the device. If the last mentioned factor is an important one, the choice would be from the alpha and beta emitting isotopes that are accompanied by little or no gamma radiation. The device would also operate in the presence of gamma radiation, but in such event external shielding would be required for biological protection. The desired life of the radiometer would also dictate the choice of radioactive isotopes. If short-lived isotopes are used, and such isotopes are formed by neutron irradiation, then the radiometer could be reactivated by insertion into a nuclear reactor. If such technique were employed, the parent isotope would have to be present in the vanes, and the rest of the structural parts of the radiometer would have to be of extremely low neutron capture probabilities.

Beta emitters and alpha emitters have been mentioned as appropriate radioisotopes for the vane structure. A preferred beta emitter is Strontium-90, which is a gamma-free beta-emitting isotope with a half-life of about 28 years.

The range of beta particles in matter being generally greater than that of alpha particles, it is likely that a fraction of the beta particles will escape the vane structure, but these would be captured in other structural elements of the device.

Such escaping particles also perform a mechanical function by virtue of the recoil or rocket kick which they impart to the extended surfaces of the vane element in its path of movement. This recoil force acts in the same direction, in the present device, as the radiometer force, thus enhancing the motion of the nuclear device. It should also be noted that while the classical type "radiometer force" is dependent on the presence of small amounts of operating gas within the case of the device, the recoil force would act even in a vacuum.

The alpha emitters are also very suitable for the intended purpose. One of these which is desirable is polonium-210. There is some gamma radiation associated with the alpha decay of this emitter, but the amount is less than 0.001 percent. There are several particular advantages in suing an alpha emitter. One is that the energy of the alpha particle is high (usually of the order of 5 m.e.v.), thus minimizing the amount of radioisotope required. Another advantage is that the alpha particles are stopped by extremely thin layers of materials so that it is easier to utilize alpha emitters with maximum radiometer efficiency. For these reasons alpha emitters are preferred for use in the vane structure of this nuclear radiometer. Where such alpha emitters are employed, the sputtered gold on one side of the mica comprises a coating of polonium alpha particles of about 20 milligrams per square centimeter, and another sputtered gold coating completes the sandwich, which is sealed by gold at its edges.

While such a nuclear radiometer would be operative on the basis of other nuclear reactions such as gamma emission and external conversion of electrons, the relative costs of the radioactive materials and possible shielding requirements tend to mitigate against their use, except for special purposes.

A suitable example of a gamma emitting material is Barium 131 (Ba 131).

A number of heavy isotopes undergo spontaneous fission and these can be used to provide selective heating. Examples of these are the transuranic elements Californium 248 (Cf 148), which has a half-life of 7,000 years, and Californium 252 (Cf 252), the half-life of which is 66 years. Other heavy actinide elements, e.g., Curcium 96 and Americium 95 also undergo spontaneous fission.

One can use isotopes of longer half-life because split fission proucts have higher heating effects than alpha, beta and gamma particles. In these instances there will be also some outside radioactivity because the fission products themselves are radioactive. Therefore, the heating effect will be enhanced, but shielding will be required because of the presence of radiation.

It is to be noted that the vane elements 22 are constrained to movement in a predetermined path by reason of their rotor mounting or shaft 19.

In view of the foregoing disclosure it will be understood by those skilled in the art to which this invention pertains that various changes and modifications can be made in the preferred embodiments of nuclear radiometer that have been illustrated and described, without departing from the principles of the invention and the scope of the appended claims.

This application is a continuation-in-part of my application Serial No. 718,013, filed February 27, 1958, now abandoned, for "Self-Powered Nuclear Device."

I claim:

1. A self-propelled nuclear radiometer comprising a casing, a rotor shaft pivotally mounted for axial rotation within the casing, and a spaced set of vanes of heat insulating material secured to the rotor shaft substantially coplanar with the axis of rotation thereof, one face only of each vane embodying a coating of radioactive material, of which at least some of the nuclear particles are retained in the same face of the vane and produce preferential heating of one face of the vane and turning movement of the rotor shaft.

2. The self-propelled nuclear radiometer as defined in claim 1 in which at least some of the nuclear particles escape and add to the rotational energy of the rotor shaft by their recoil effect.

3. In a self-propelled nuclear radiometer, a rotor member mounted for rotation about a vertical axis, and a plurality of vanes secured to the rotor member substantially coplanar with the axis of rotation thereof, each of said vanes facing in the same direction of rotation and comprising a base sheet of mica, an alpha emitting coating layer over one face only of the base sheet, and a thin coating layer of gold covering the alpha emitting layer.

4. An educational device comprising a closed casing of optically transparent material, a rotor shaft pivotally mounted for axial rotation within the casing, a spaced set of vanes fixedly secured to the rotor shaft in coplanar relation to the axis of rotation, each vane facing in the same direction of rotation and comprising a sheet of mica, a first coating layer of gold over the mica, a coating layer of radioactive material selected from the group consisting of alpha and beta emitters over the gold layer and a second coating layer of gold over said coating layer of radioactive material.

5. The combination of claim 4 in which the casing is evacuated to a pressure of the order of $10^{-8}$ mm. of mercury.

6. The combination of claim 4 including a pointer mounted on the shaft in longitudinally spaced relation to the set of vanes.

7. The combination of claim 4 in which the casing contains a gaseous medium.

8. In a self-propelled nuclear radiometer, a closed casing containing as the sole working element a rotor having a vane construction embodying a support formed of material having a coefficient of heat conductivity substantially lower than that of most metals in the direction of its thickness, one surface only of said vane having thereon a layer of radioactive material capable of preferentially heating sadi surface by absorption of the energy of the radioactive material.

9. In a self-propelled nuclear radiometer, an enclosed casing containing as the sole working element a rotor having a vane construction embodying a support of material having a coefficient of heat conductivity in the direction of its thickness less than that of most metals and coated on one face only with radioactive material selected from the group consisting of alpha, beta, and gamma emitters capable of heating said face preferentially.

10. In a self-propelled nuclear radiometer, an enclosed casing containing as the sole working element a rotor having a vane construction embodying a support of material having a coefficient of heat conductivity in the direction of its thickness less than that of most metals and coated on one face only with a coating of alpha emitting material capable of heating said face preferentially.

11. In a self-propelled nuclear radiometer, an enclosed casing containing as the sole working element a rotor having a vane construction embodying a support of material having a coefficient of heat conductivity in the direction of its thickness less than that of most metals and coated on one face only with a coating of beta emitting material capable of heating said face preferentially.

12. A self-propelled nuclear device comprising a closed casing containing as the sole working part a rotor having a moving element wtih opposite facing extended surfaces, radioactive material on one surface only of said element for propelling the moving element by means of the reaction force exerted substantially normal to said one surface by radioactive particles discharged from said material, said rotor guiding the discharge propelled moving element in a predetermined path substantially normal to said one surface as the element moves in response to the discharge of radioactive particles from the one extended surface thereof.

13. The combination of claim 12 in which the moving element is carried by a rotating shaft and the casing is partially evacuated.

14. A self-propelled device having in combination, a partially evacuated casing, an independently operable element having a coefficient of heat conductivity less than that of most metals and disposed within said casing and providing a single extended side thereof embodying radioactive material discharging radioactive particles principally from said side and means directing the movement of said element in a predetermined path substantially normal to said side as a result of the reaction from said discharge.

15. The invention as defined in claim 14 in which the moving element travels in a gas-containing space in said casing and some of the radioactive particles are absorbed in said one side of the moving element and cause preferential heating of that side, and some of said particles escape from the same side of the moving element to cause movement thereof by the combined action of preferential heating and escape reaction effect.

References Cited in the file of this patent

UNITED STATES PATENTS

| | | |
|---|---|---|
| 1,192,706 | Thomson | July 25, 1916 |
| 1,999,407 | Dumont | Apr. 30, 1935 |
| 2,335,287 | Tongerich | Nov. 30, 1943 |
| 2,644,026 | Grenier | June 30, 1953 |
| 2,824,246 | Keller | Feb. 18, 1958 |
| 2,934,887 | Keller | May 3, 1960 |

OTHER REFERENCES

Conduction of Electricity Through Gases, by Thompson, Cambridge Press, 1905, pages 499–502.